J. W. CLARK.
GATE.
APPLICATION FILED APR. 24, 1914.
1,139,163.
Patented May 11, 1915.
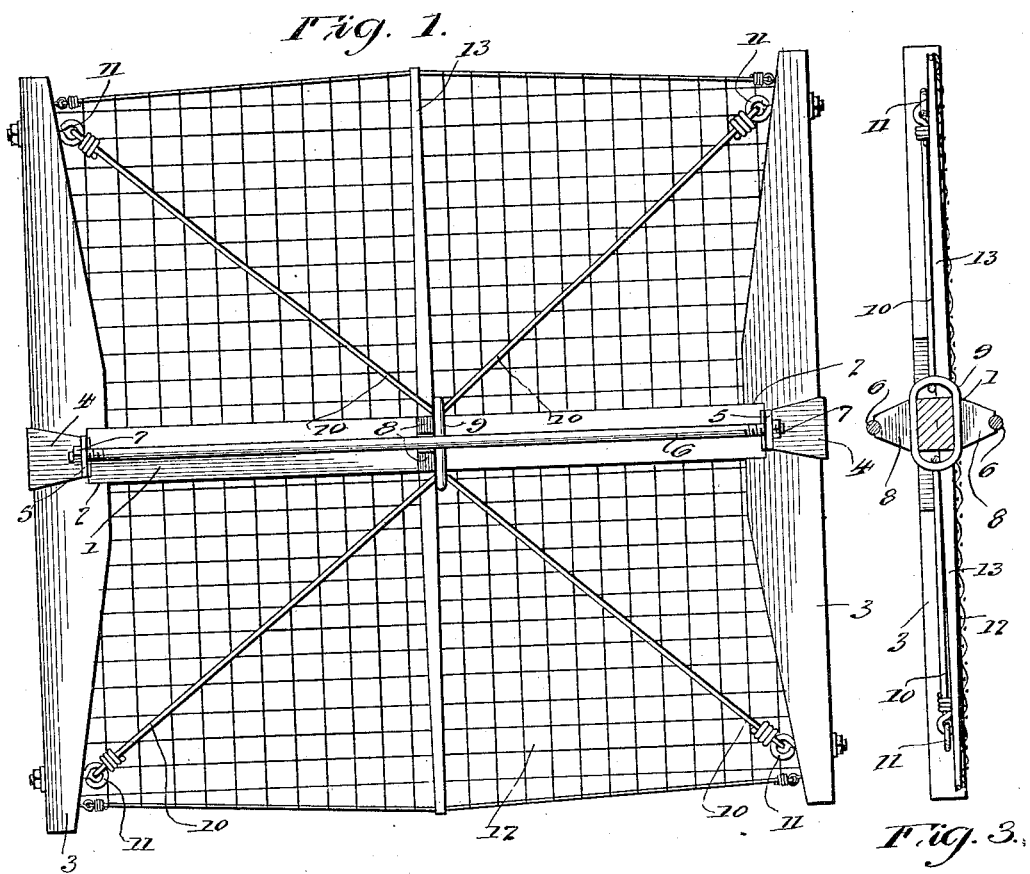
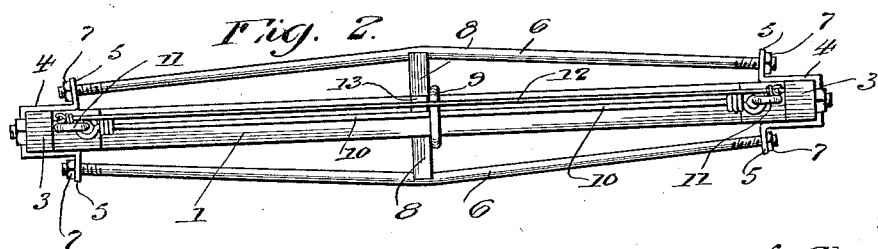

UNITED STATES PATENT OFFICE.

JOHN W. CLARK, OF KIMMELL, INDIANA.

GATE.

1,139,163.  Specification of Letters Patent.  Patented May 11, 1915.

Application filed April 24, 1914. Serial No. 834,187.

*To all whom it may concern:*

Be it known that I, JOHN W. CLARK, a citizen of the United States, residing at Kimmell, in the county of Noble and State of Indiana, have invented new and useful Improvements in Gates, of which the following is a specification.

This invention relates to improvements in gates and especially with reference to the construction of the frame of a gate, the object of the invention being to provide an improved gate having a frame comprising a longitudinal bar and a pair of vertical end bars and means to secure the end bars on the ends of the longitudinal bar without the employment of nails, screws, bolts or other such devices and by means of which the frame of the gate may be braced and strengthened as well as enabled to be readily disassembled and assembled when desired.

The invention consists in the construction, combination and arrangement of devices hereinafter described and claimed.

In the accompanying drawing:—Figure 1 is a side elevation of a gate having a frame constructed in accordance with my invention. Fig. 2 is a plan of the same. Fig. 3 is a transverse sectional view of the same.

The longitudinal bar 1 has its ends arranged in recesses 2 at the centers of and in the opposing sides of a pair of vertical end bars 3. The end bars may be detached when desired. On the end bars are clips 4 which are arranged astride of and near their center portions in line with the bar and have outstanding arms 5. Truss rods 6 connect the arms of the clips and arranged on opposite sides of and spaced from the bar 1. The truss rods have threaded end portions which pass through openings in the arms 5 and are provided with securing and adjusting nuts 7. Struts 8 are arranged on opposite sides of the bar 1. They extend outwardly therefrom and engage the truss rods and coact with them to firmly place the frame in braced position as well as to detachably secure the end bars in place. A link 9 which is arranged on the bar 1 has brace wires 10 and their center portions engage with opposite ends of the link and their end portions secure with the eye bolts 11 which pass through and are adjustably mounted in openings near the ends of the bars 3. Said wires coact with the link to brace the end bars 3 and also to adjust them when necessary. Any suitable wire fabric may be employed on the gate frame. I here show wire fabric 12 connecting the end bars and provided at the center with brace rods 3.

My improved gate frame is extremely cheap and simple in construction, is very strong and durable, may be readily assembled and disassembled is not liable to sag and the parts may be adjusted when desired.

Having thus described my invention, I claim:—

The herein described gate frame comprising a longitudinal centrally arranged bar, vertical end bars having their central portions detachably arranged on the ends of the longitudinal bar, struts on opposite sides of the longitudinal bar, clips on the centers of the end bars arranged in line with the longitudinal bar and having outstanding arms, and truss rods having their central portions engaged with the outer sides of the struts and with end portions engaged with the and with end portions extended through openings in the arms of the clips and provided with nuts threaded thereon and engaging the outer sides of the clip arms.

In testimony whereof I affix my signature in presence of two witnesses.

JOHN W. CLARK.

Witnesses:
ALBRET BORDNER,
JOHN KETTLEBARROW.

Copies of this patent may be obtained for five cents each, by addressing the "Commissioner of Patents, Washington, D. C."